US007840494B2

(12) United States Patent
Wiederin

(10) Patent No.: US 7,840,494 B2
(45) Date of Patent: Nov. 23, 2010

(54) SYSTEMS AND METHODS FOR MONETARY TRANSACTIONS BETWEEN WIRED AND WIRELESS DEVICES

(75) Inventor: Shawn Wiederin, Cedar Rapids, IA (US)

(73) Assignee: Verizon Business Global LLC, Ashburn, VA (US)

( * ) Notice: Subject to any disclaimer, the term of this patent is extended or adjusted under 35 U.S.C. 154(b) by 542 days.

(21) Appl. No.: 09/950,025

(22) Filed: Sep. 12, 2001

(65) Prior Publication Data

US 2003/0050896 A1 Mar. 13, 2003

(51) Int. Cl.
*G06Q 20/00* (2006.01)
(52) U.S. Cl. ........................................................ 705/64
(58) Field of Classification Search ............. 705/64–68, 705/70–79, 16–18, 26–27, 30, 34–35, 38–44; 455/3; 340/5; 380/270–272; 725/81, 123, 725/1, 5; 707/607, 705–706, 713, 769–771, 707/781–786; 370/310, 310.1
See application file for complete search history.

(56) References Cited

U.S. PATENT DOCUMENTS

| 5,591,949 | A |   | 1/1997  | Bernstein ...................... 235/380 |
| 5,754,655 | A |   | 5/1998  | Hughes et al. ................. 380/24  |
| 6,018,724 | A |   | 1/2000  | Arent ........................... 705/44  |
| 6,026,375 | A | * | 2/2000  | Hall et al. ...................... 705/26 |
| 6,119,107 | A |   | 9/2000  | Polk ............................. 705/40  |
| 6,260,024 | B1| * | 7/2001  | Shkedy ......................... 705/37  |
| 6,976,011 | B1| * | 12/2005 | Capitant et al. ................ 705/67  |
| 2002/0016765 | A1 | * | 2/2002  | Sacks .......................... 705/39  |
| 2002/0147658 | A1 | * | 10/2002 | Kwan ........................... 705/26  |
| 2005/0086164 | A1 | * | 4/2005  | Kim et al. ..................... 705/40  |

FOREIGN PATENT DOCUMENTS

WO    WO 9745814 A  * 12/1997

OTHER PUBLICATIONS

Wreden, "Wireless Overcomes Security Woes", Informationweek, n798, pp. 78-80, Aug. 7, 2000.*
http://www.ecash.com/top.htm "*CyberCharge your system*" 4 pages, Apr. 23, 2001.
http://www.clickz.com "*Instant e-Commerce*" 6 pages, Apr. 23, 2001.
http://www.ecommercetimes.com "*Amazon Testing Micropayments via Music Downloads*" by Keith Regan, 3 pages, Feb. 28, 2001.
http://www.techniformer.com "*Palm boasts first credit card purchase from a PDA*" by James Niccolai, 3 pages, Jan. 6, 2001.

(Continued)

*Primary Examiner*—Mary Cheung

(57) ABSTRACT

A monetary transaction system allows one or more wireless or wired devices, or a combination of these devices, to perform a transfer of currency or monetary funds from one online financial account to another financial account. After a user's profile is created, all of the necessary steps to verify the profile, availability of funds, security related issues and debiting and crediting of the appropriate account can be performed quickly and easily from the user's device. Thus, the transaction system will allow the transfer of funds between wired or wireless devices or appliances.

33 Claims, 3 Drawing Sheets

OTHER PUBLICATIONS http://www.echarge.com "*I Buy It with eCharge*", 1 page, Apr. 23, 2001.

http://www.paypal.com "*The way to send and receive money online*", 1 page, Apr. 23, 2001.

http://www.cybersource.com "*Commerce Infrastructure Solutions for the enterprise*", 1 page, Apr. 23, 2001.

http://www.cybercash.com "*The E-Commerce Leader in Payment Solutions*", 2 pages, Apr. 23, 2001.

http://www.homeplug.com—1 page, May 2, 2001.

* cited by examiner

SYSTEMS AND METHODS FOR MONETARY TRANSACTIONS BETWEEN WIRED AND WIRELESS DEVICES

BACKGROUND OF THE INVENTION

1. Summary of the Invention

This invention relates generally to monetary related transactions. In particular, this invention relates to a transfer of currency or monetary funds from one financial account to another financial account.

2. Description of Related Art

The Internet is drastically changing the traditional manner in which items and services are purchased. For example, if a user establishes a web site, and wants to sell their particular goods and/or services, the user can set up a credit card fulfillment processing system. Online person-to-person payment systems or micropayment system fulfillment utilizes a "virtual bank" which in essence allows people to e-mail monies between each other. In particular, online person-to-person payment systems or micropayment systems transfer money from one online account to another on-line account at a virtual bank. Specifically, a user logs on to one of the online person-to-person payment systems or micropayment system fulfillment sites, such as www.paypal.com, and transfers funds from their online account to, for example, the buyer's account managed by the virtual bank. The parties are then alerted that a monetary transaction has occurred, and the amount of money transferred into their virtual bank account.

SUMMARY OF THE INVENTION

While existing electronic monetary transfer systems work well in general, they at least fail to allow the ability to transfer currency or monetary funds from one wireless device, to one or more other wired and/or wireless devices, or visa versa.

The systems and methods of this invention will allow a user of a wireless or a wired device, or a combination of devices, to perform a transfer of currency or monetary funds from one on-line financial account to one or more online financial account(s). In general, in an exemplary embodiment of this invention, after a user's account profile is created, all the necessary steps to verify the profile, the account's fund availability, security related functions and debiting and crediting of the respective accounts can be initiated from the user device. Thus, the systems and methods of this invention will allow the transfer of funds between one or more wired and/or wireless devices.

For example, assume an individual requests their air conditioner be repaired by XYZ repair company while they are at work. Since there is no personal interaction between the repairman and the individual, there is no easy way to pay the repairman. Using the systems and methods of this invention, the individual can receive a call from the repairman indicating the completion of the repairs to the air conditioner. The individual can then utilize, for example, a personal digital assistant (PDA) to make payment to XYZ repair's financial account. In particular, individuals can log into their account, specify the payee and the amount, and click on, for example, a "submit payment" button to transfer funds from the individual's account to the XYZ's repair's account.

Aspects of the present invention relate to a monetary transaction system. A payment processing system allows a transfer of currency or monetary funds from one online financial account to another online financial account(s).

Aspects of the present invention also relate to systems and methods for the transfer of currency or monetary funds from one wireless device to one or more other wired and/or wireless devices, or visa versa.

Aspects of the present invention also relate to systems and methods for managing monetary transactions between one or more entities.

Aspects of the present invention additionally relate to determining, storing and maintaining payor and payee profile information. This profile information can include, for example, user information, financial information, device information, security information, historical information, trend information, automatic payment information and transaction information.

These and other features and advantages of this invention are described in or are apparent from the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

The systems and methods of this invention provide the ability to transfer currency or monetary funds from one wireless device to one or more wired or wireless device, or visa versa. In an exemplary embodiment, the user of the wired or wireless device establishes a profile of their financial account which can be accessed and utilized from any of a number of wired or wireless devices. The user's financial profile can then be stored in, for example, a secure server which contains the necessary data to transfer currency such as, user information, financial data pertinent to perform a currency related transaction, device information which, for example, identifies one or more devices, security information, and, for example, additional profile or demographic data related to or utilized for previous and/or future transactions. Additionally, the profile can include a unique identifier, such as an electronic number (ENUM), an IP address, a serial number, or the like, and can be utilized to identify the one or more wired or wireless devices used by the user.

After a user has completed the initial profile set up, the user will have the ability to transfer currency or monetary funds from a first device to one or more other wired or wireless devices. In particular, in an exemplary embodiment of this invention, the user can input from, for example, a graphical user interface or other input interface on a particular device, the amount of currency to transfer to another account and, optionally, their password. Next, the user could, for example, select a unique identifier which corresponds to one or more other devices, or entities, to transfer the currency to. Then, in an exemplary embodiment, upon completion of the verification and security steps, the systems and methods of this invention can commence the transfer of funds from one account to another.

In particular, in an exemplary embodiment of this invention, a payment processing system receives a request from the user's device to perform a transfer of funds from one account to one or more account(s). Initially, the payment processing system verifies whether the transaction can be performed, for example, by verifying account balances, user identities, or the like. Upon verification that the transaction can be performed, the payment processing system performs the necessary processes to correctly debit and credit the accounts involved for the transfer of the currency or monetary funds. A verification message can then be sent to one or more of the transferor and transferee of each device and/or entity involved in the transaction.

Figure 1:
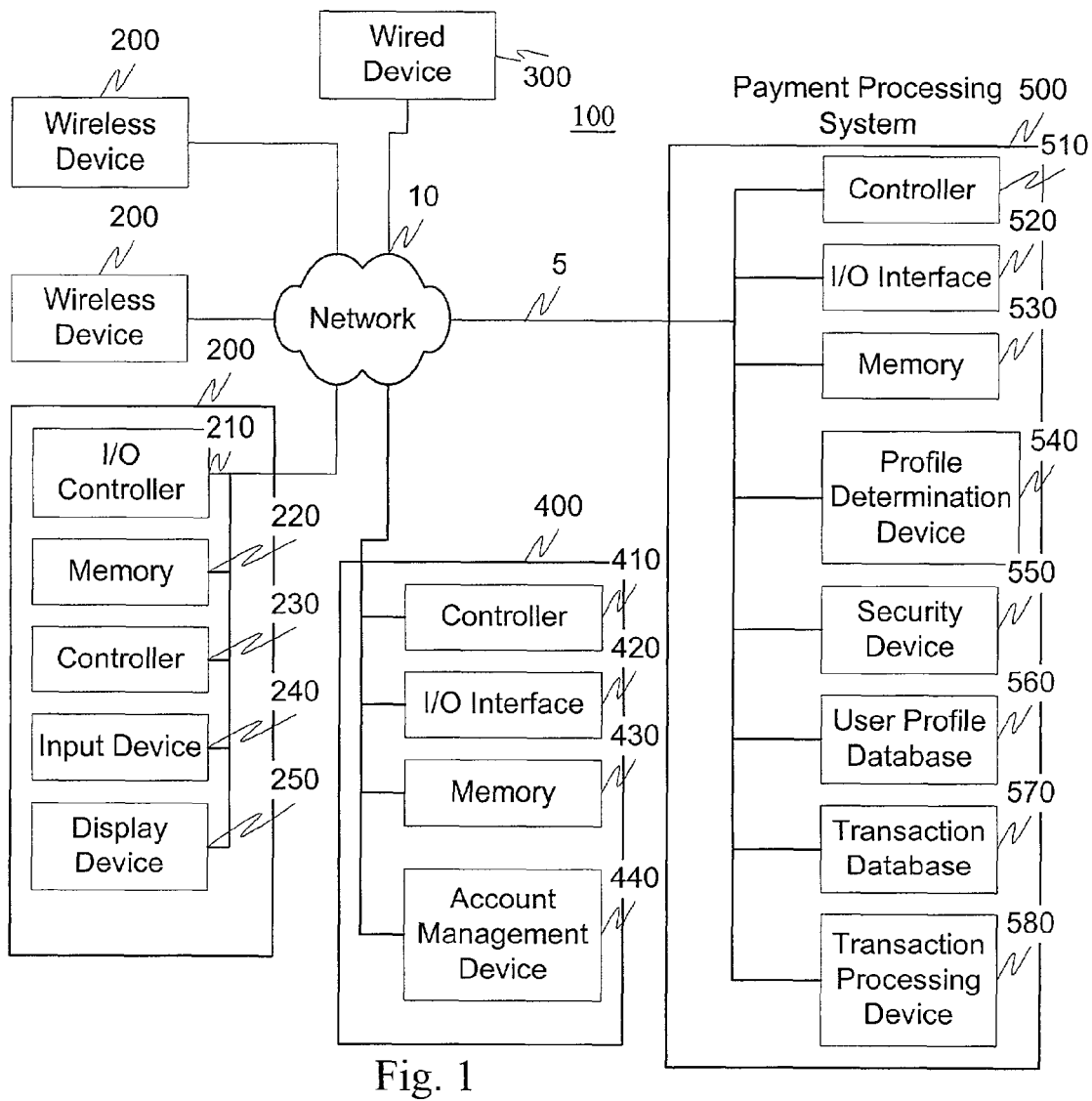
FIG. 1 is a functional block diagram illustrating an exemplary transaction system according to this invention.

FIG. 1 illustrates an exemplary embodiment of the transaction system 100 according to this invention. In particular, the transaction system 100 comprises one or more wireless devices 200, one or more wired devices 300, a credited device 400 and a payment processing system 500, interconnected by links 5 and network 10. The wireless device 200 comprises an I/O controller 210, a memory 220, a controller 230, an input device 240 and a display device 250, interconnected by link 5. Similarly, the wired device 300 can have comparable components as the wireless device 200. The credited device 400 comprises a controller 410, an I/O interface 420, a memory 430 and an account management device 440. The payment processing system 500 comprises a controller 510, an I/O interface 520, a memory 530, a profile determination device 540, a security device 550, a user profile database 560, a transaction database 570, and a transaction processing device 580, all interconnected by link 5.

While the exemplary embodiment illustrated in FIG. 1 shows various components of the transaction system 100 collocated, it is to be appreciated that various components of the transaction system can be located at distance portions of a distributed network, such as a local area network, a wide area network, a telecommunications network, an intranet and/or the Internet, or within a dedicated transaction system. Thus, it should be appreciated, that the components of the transaction system 100 can be combined into one or more devices or collocated on a particular node of a distributed network. As will be appreciated from the following description, and for reasons of computational efficiency, the components of the transaction system 100 can be arranged in any location within a distributed network without affecting the operation of the system.

Furthermore, the links 5 can be a wired or wireless link, or combination thereof, or any known or later developed element(s) that is capable of supplying and communicating electronic data to and from the connected elements. Additionally, the network 10 can be a wired or wireless network, or a combination thereof, that is capable of supplying and communicating electronic data to and from the connected elements.

The wireless and wired devices, 200 and 300 respectively, can be any device or combination of devices from which a monetary transaction can be accomplished. For example, the devices can be a personal digital assistant (PDA), a cellular telephone, a wireless pager, a PC tablet, a television, a personal computer, a wireless e-mail device, a wireless telephone, or the like, or, for example, a refrigerator, washing machine, Internet access device or the like with a wired or wireless connection to a distributed network. For example, the appliances may run a "Bluetooth" type communications scheme that would allow them access to the systems and methods of this invention.

In operation, a user, via, for example, a wireless device 200 or a wired device 300, initiates a transaction. For example, a user, via the input device 240 and display device 250, with the cooperation of controller 230, the memory 220 and the I/O controller 210, indicates that a monetary transaction is desired. For example, the input device 240 can be a keyboard, mouse, speech-to-text converter, stilus, keypad, or the like. Similarly, the display device 250 can be a computer monitor, a display on a PDA, or any other device capable of displaying information to one or more users. In general, the input device 240 can be any input device that is capable of receiving information from a user.

Upon an indication that a user desires a monetary transaction from the wireless device 200, this request is sent, via network 10 and with the cooperation of the link 5, to the payment processing system 500. The payment processing system 500, in cooperation with the controller 510, the I/O interface 520, the memory 530 and the user profile database 560, determines whether this is the initial use of the payment processing system for this particular user. If it is the initial use, the profile determination device 540 queries the user to establish a profile. The profile can include, for example, user information, financial information, device information, security information, historical information, transaction information, authorized recipient information, or the like. Once the profile determination device 540 has determined a user profile, the user profile is stored in the user profile database 560 with the cooperation of the controller 510 and the memory 530. Next, via the input device 240 and the display device 250, a user selects a payee(s) and the amount to be transferred to that payee(s). This information is then forwarded to the payment processing system 500.

Additionally, the systems and methods of this invention can incorporate various security measures, such as firewalls, and encryption that is well known in the art and can be used to further protect one or more of the parties associated with the transaction. For example, the payment processing system 500 can be located behind a firewall and all communications between the wireless devices 200 and the wired devices 300, or a portion thereof, can be encrypted. Similarly, the payment processing system 500 and the wired or wireless devices can use passwords to further protect users associated with the transaction.

In an exemplary embodiment of this invention, along with selecting the payee and the amount, the user is also requested to enter a password for their account which is forwarded to the payment processing system 500. The payment processing system 500 determines, with the cooperation of the controller 510, the I/O interface 520, the memory 530 and the security device 550, whether the password is correct.

If the password is incorrect, the user can, for example, be prompted to reenter the password. Alternatively, after a predetermined number of incorrect password attempts, the security device 550 can prompt the user for, for example, a secret word which may, for example, provide a hint for the user as to what their password may be. If, after a predetermined number of incorrect attempts, the user is still unable to log into the system, the payment processing system 500 can, for example, lock out that particular user or otherwise temporarily disable their account until an additional action is taken. Therefore, the payment processing system 500 is able to communicate with the user to provide them with the status of their authentication attempts.

If the submitted password is correct, the payment processing system 500, in cooperation with the user profile database 560, the controller 510 and the memory 530 verifies the account status, device identification and/or user information. If the transaction is unauthorized, for example, if there are insufficient funds, if the account has been disabled, if previous fraudulent activity of a user has been detected, or the like, a message can be forwarded to the user to that affect. If the transaction is authorized, the payment processing system 500, in cooperation with the user profile database 560, determines if a payee profile is available. If a payee profile is not available, the profile determination device 540 can determine or request a payee profile. For example, the payment processing system 500, in cooperation with the profile determination device 540, the controller 510, the I/O interface 520 and the memory 530, can prompt the credited device 400 for profile information, which can, for example, be stored in the memory 430. The information received from the credited device 400 is then stored in the user profile database 560. Alternatively, the profile determination device 540 can determine a profile for the credited device 400, based on, for example, a look-up technique, identification information, e.g., a presence, another profile database, or the like.

If the payee information is available, the payee information can be validated thus allowing completion of the transaction. Next, the transaction database 570, the transaction processing device 580, the controller 510, the I/O interface 520 and the memory 530 complete the necessary debiting and crediting procedures between the associated parties to complete the transaction. Specifically, the payment processing system 500, via the network 10, links 5 and with the cooperation of the controller 410, the I/O interface 420, the memory 430 and the account management device 440, appropriately credits the payee. Alternatively, the account information for the payee may be stored remotely, for example, somewhere on the network 10. Upon successful completion of the transaction, one or more of the payor and payee can be notified that the transaction has been completed. The notification can include, for example, the amount, the parties involved, and time and date information. Additionally, the notification can include, for example, an itemization of the goods and/or services associated with the transaction, account information, and a receipt.

Figure 2:
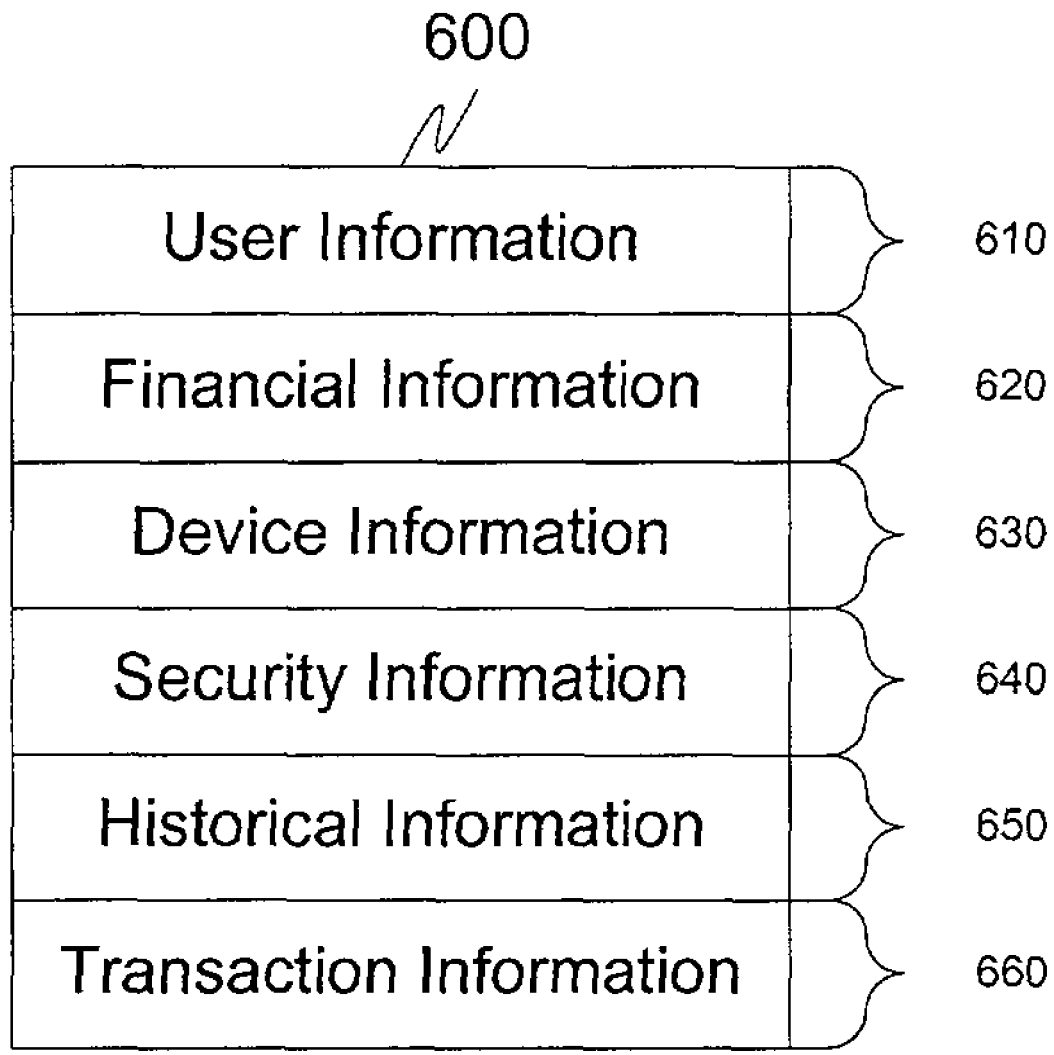
FIG. 2 illustrates an exemplary profile according to this invention.

FIG. 2 illustrates an exemplary profile which can be stored, for example, in the user profile database 560. The exemplary profile 600 comprises, user information 610, financial information 620, device information 630, security information 640, historical information 650 and transaction information 660. The user information 610 can comprise, for example, personal information about the user such as name, age, address, city, state, phone, fax, e-mail address, wireless phone number, or the like. The financial information portion 620 can comprise, for example, account information, bank information, balance information, or the like. The device information portion 630 can comprise, for example, identifiers of one or more wired or wireless devices that are associated with the user, or the like. For example, these device identifiers can be IP addresses, electronic numbers identifiers (ENUM), or the like. The security information portion 640 comprises, for example, password information, encryption information, fraud related data elements or flags, or the like. The historical information portion 650 comprises, for example, historical transaction information, historical spending information, historical purchase information, or the like. The transaction information portion 660 comprises, for example, information pertaining to the amounts, dates, times, and parties associated with the one or more transactions. In general, the user profile 600 can comprise any information that can be used to facilitate a transaction between one or more parties.

Figure 3:
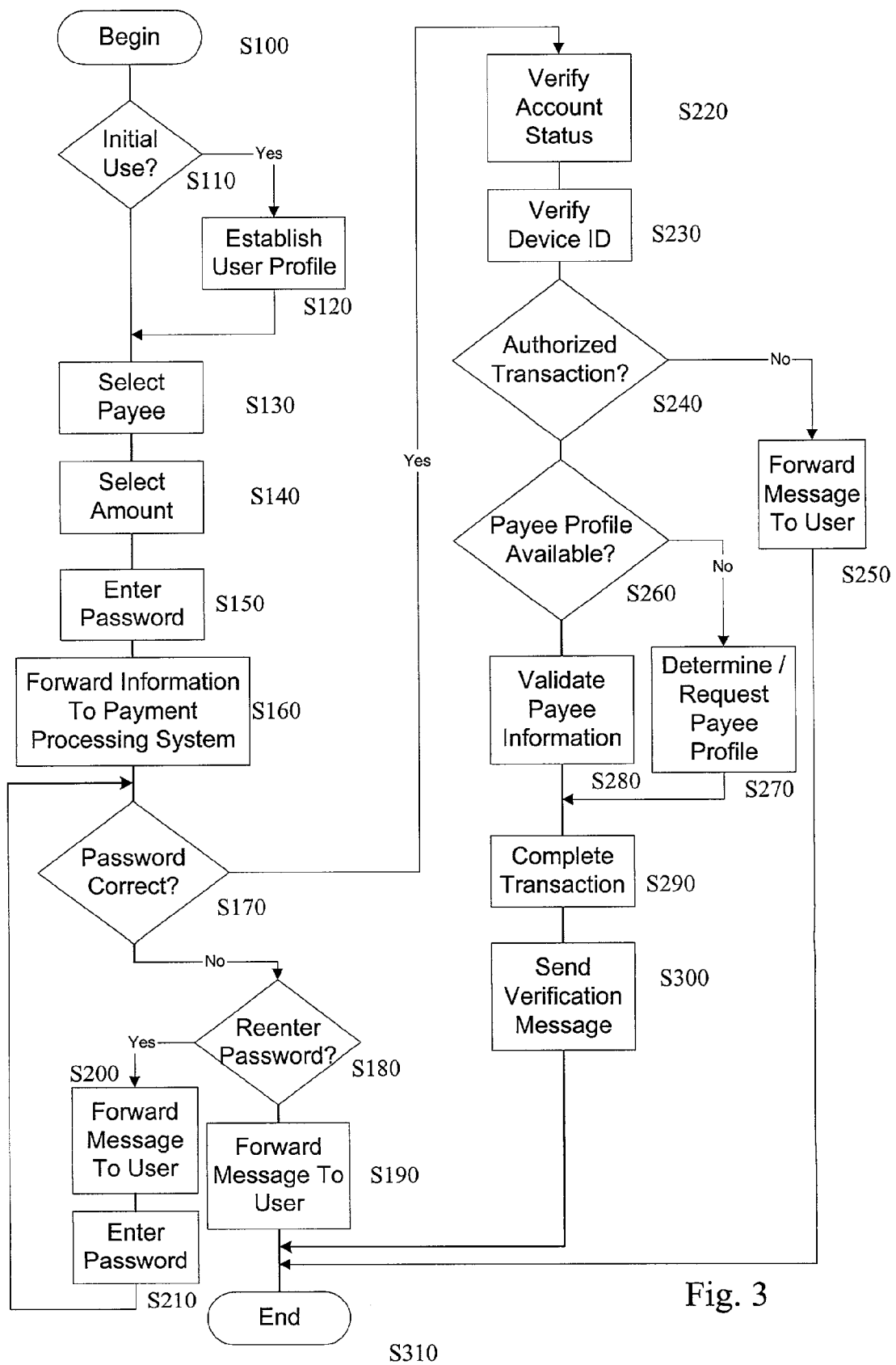
FIG. 3 is a flowchart outlining an exemplary method for transferring currency or monetary funds according to this invention.

FIG. 3 illustrates an exemplary embodiment of the method for completing a transaction according to this invention. In particular, control begins in step S100 and continues to step S110. In step S110, a determination is made whether this is the initial use of the system. If it is not the initial use, control jumps to step S130. Otherwise, control continues to step S120 where a user profile is established. Control then continues to step S130.

In step S130, a payee is selected. Next, in step S140, an amount is selected. Then, in step S150, a password is entered. Control then continues to step S160.

In step S160, the payee, amount, and password information, is forwarded to the payment processing system. Next, in step S170, a determination is made whether the password is correct. If the password is correct, control jumps to step S220. Otherwise, control continues to step S180. In step S180, a determination is made whether to allow reentry of the password. If reentry of the password is allowed, control continues to step S200 where a message is forwarded to the user. Next, in step S210, the user reenters the password and control jumps back to step S170.

If reentry of the password is not allowed, control continues to step S1190 where a message is forwarded to the user. Control then jumps to step S310 where the control sequence ends.

In step S220, the account data is verified. Next, in step S230, the identification of the user device is verified. Then, in step S240, a determination is made whether the transaction is authorized. If the transaction is authorized, control continues to step S260. Otherwise, control jumps to step S250 where a message is forwarded to the user and the control sequence ends.

In step S260, a determination is made whether payee profile information is available. If payee profile information is available, control continues to step S280. In step S280, the payee information is validated. Control then continues to step S290.

If payee profile is not available, control jumps to step S270 where the payee profile information is determined or requested from the payee. Control then jumps to step S290.

In step S290, the transaction is completed and the appropriate accounts are debited and/or credited. Next, in step S300, verification messages are sent to one or more of the parties associated with the transaction. Control then continues to step S310 where the control sequence ends.

As illustrated in FIG. 1, the transaction system can be implemented either on a single programmed general purpose computer, or a separate programmed general purpose computer. However, the transaction systems can also be implemented on a special purpose computer, a programmed microprocessor or microcontroller and peripheral integrated circuit elements, an ASIC, or other intergrated circuit, a digital signal processor, a hardwired electronic or logic circuit such as a discrete element circuit, a programmable logic device such as a PLD, PLA, FPGA, PAL, or the like. In general, any device capable of implementing a finite state machine that is in turn capable of implementing the flowchart illustrated in FIG. 3 can be used to implement the transaction system according to this invention.

Furthermore, the disclosed method may be readily implemented in software using an object or object-oriented software development environment that provides portable source code that can be use on a variety of computer or workstation hardware platforms. Alternatively, the disclosed transaction system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The electronic message management systems and methods illustrated herein however, can be readily implemented in hardware and/or software using any know or later developed systems or structures, devices and/or software by those of ordinary skill in the applicable art from the functional description provided herein and with a general basic knowledge of the computer arts.

Moreover, the disclosed methods may be readily implemented as software executed on a programmed general purpose computer, a special purpose computer, a microprocessor, or the like. In these instances, the methods and systems of this invention can be implemented as a program embedded on a personal digital assistant system, such as in a JAVA® or CGI script, as a resource residing on a server or graphics workstation, as a routine embedded in a dedicated transaction processing system, a web browser, an electronic message enabled cellular phone, a PDA, an appliance, a dedicated transactions system, or the like. The transaction system can also be implemented by physically incorporating the system into a software and/or hardware system such as the hardware and software systems of a server and wired or wireless device.

It is, therefore, apparent that there has been provided, in accordance with the present invention, systems and methods for allowing transactions of currency or monetary funds. While this invention has been described in conjunction with a number of embodiments, it is evident that many alternatives, modifications, and variations would be or are apparent to those of ordinary skill in the applicable arts. Accordingly, it is intended to embrace all such alternatives, modifications, equivalents and variations that are within the spirit and scope of this invention.

What is claimed is:

1. A monetary transaction system comprising:
    a payment processing system to:
        associate a profile with a user, the profile including security information, historical information, and at least one of financial information, device information, transaction information, or authorized recipient information,
        receive, from a wireless device associated with the, a request for a monetary transaction,
        identify, in response to receiving the request for the monetary transaction, the profile associated with the user,
        receive, from the wireless device, information identifying a payee and information identifying an amount, of the monetary transaction,
        verify identification information of the wireless device based on an Internet Protocol (IP) address associated with the wireless device and one or more IP addresses, of one or more devices associated with the user, included in the identified profile,
        determine, in response to receiving the information identifying the amount, whether sufficient funds exist in a first account associated with the user, whether the first account has been disabled, and whether a previous fraudulent activity of a user has been detected,
        determine, in response to receiving the information identifying the payee, whether a profile associated with the payee exists, the profile associated with the payee including information identifying a second account associated with the payee,
        request the profile associated with the payee when the profile associated with the payee does not exist,
        transfer funds between the first account and the second account, based on the information identifying the amount, and based on determining whether sufficient funds exist in the first account associated with the user, whether the first account has been disabled, and whether a previous fraudulent activity of a user has been detected, and
        send, in response to transferring the funds, a notification of the transfer of the funds to the wireless device, the notification including an itemization of goods or services associated with the transfer.

2. The system of claim 1, where the payment processing system includes a profile determination device that determines the profile associated with the user and the profile associated with the payee.

3. The system of claim 2, where the profile determination device determines the profile associated with the payee based on at least one of a look-up technique, identification information, or a profile database.

4. The system of claim 1, where the payment processing system includes a transaction database that records information about the transfer of the funds.

5. The system of claim 1, where the wireless device includes at least one of a personal digital assistant (PDA), a cellular telephone, a wireless pager, a PC tablet, a television, a personal computer, a wireless e-mail device, a wireless telephone, an appliance, a refrigerator, a washing machine, or a distributed network access device.

6. The system of claim 1, where the profile associated with the user further comprises user information, and where the user information comprises at least one of personal information about the user including a name, an age, an address, a city, a state, a phone, a fax, an e-mail address or a wireless phone number.

7. The system of claim 1, where the payment processing system includes a security device that monitors passwords, encrypts information, or monitors user information.

8. The system of claim 1, where the security information includes fraud related information associated with the first account and password information, and where the historical information includes historical transaction information, historical spending information, and historical purchase information.

9. A method for performing a monetary transaction, the method comprising:
    identifying, by a server device, a profile associated with a user, in response to receiving a request for a monetary transaction from a wireless device associated with the user;
    receiving, at the server device and from the wireless device, in response to identifying the profile associated with the user, payee identification information, and amount information, associated with the monetary transaction;
    verifying, by the server device, identification information associated with the wireless device based on an Internet Protocol (IP) address associated with the wireless device and at least one IP address, of one or more devices associated with the user, included in the identified profile;
    identifying, by the server device, a first account associated with the user based on the identified profile;
    determining, by the server device and based on the identified first account, whether a previous fraudulent activity has been detected for the identified first account, and at least one of whether the identified first account has been disabled, or whether sufficient funds exist in the identified first account;
    prompting, by the server device, a payee device associated with the payee, for information relating to a second account associated with the payee, based on the payee identification information; and transferring, by the server device, funds between the identified first account and the second account, based on the amount information, the verified identification information associated with the wireless device, and the determining.

10. The method of claim 9, further comprising determining a payee profile.

11. The method of claim 10, where the payee profile is based on the information relating to the second account associated with the payee.

12. The method of claim 9, where the profile associated with the user comprises at least one of financial information, device information, security information, historical information, transaction information, or authorized recipient information.

13. The method of claim 9, further comprising recording information about the transfer of funds.

14. The method of claim 9, where the wireless device includes at least one of a personal digital assistant (PDA), a cellular telephone, a wireless pager, a PC tablet, a television, a personal computer, a wireless e-mail device, a wireless telephone, an appliance, a refrigerator, a washing machine, or a distributed network access device.

15. The method of claim 9, where the profile associated with the user comprises at least one of personal information about the user including a name, an age, an address, a city, a state, a phone, a fax, an e-mail address, or a wireless phone number.

16. The method of claim 9, further comprising at least one of monitoring passwords, encrypting information, or monitoring user information.

17. A tangible computer-readable medium containing instructions for controlling at least one processor to perform a method for conducting a monetary transaction, the tangible computer-readable medium comprising:
one or more instructions for receiving transaction information from a wireless device associated with a user, where the transaction information includes payee identification information, a profile associated with the user, and amount information;
one or more instructions for verifying information identifying the wireless device, based on an Internet Protocol (IP) address of the wireless device and at least one IP address, of at least one device associated with the user, included in the profile,
one or more instructions for identifying a first account associated with the user based on the transaction information;
one or more instructions for determining whether sufficient funds exist in the identified first account, whether the identified first account has been disabled, and whether a previous fraudulent activity of a user has been detected for the first account,
one or more instructions for prompting a payee device associated with the payee, for information relating to a second account associated with the payee, based on the transaction information; and
one or more instructions for transferring funds between the first account and the second account, based on the transaction information, the verified information identifying the wireless device, and the determining.

18. The computer-readable medium of claim 17, further-comprising one or more instruction for determining the profile associated with the user and a payee profile.

19. The computer-readable medium of claim 18, where the profile associated with the user comprises at least one of financial information, device information, security information, historical information, transaction information, or authorized recipient information.

20. The computer-readable medium of claim 18, where the payee profile is based on the information relating to the second account associated with the payee.

21. The computer-readable medium of claim 17, further comprising one or more instructions for recording information about the transfer of the funds.

22. The computer-readable medium of claim 17, where the wireless device includes at least one of a personal digital assistant (PDA), a cellular telephone, a wireless pager, a PC tablet, a television, a personal computer, a wireless e-mail device, a wireless telephone, an appliance, a refrigerator, a washing machine, or a distributed network access device.

23. The computer-readable medium of claim 17, where the transaction information comprises at least one of personal information about the user including a name, an age, an address, a city, a state, a phone, a fax, an e-mail address, or a wireless phone number.

24. The computer-readable medium of claim 17, further-comprising one or more instructions for at least one of monitoring passwords, encrypting information, or monitoring user information.

25. A network device comprising:
a first component to receive monetary transaction information from a device associated with a payer, the monetary transaction information including at least payee identification information, user information, device identification information associated with the device, and amount information;
a second component to verify the device identification information, based on an Internet Protocol (IP) address associated with the device and one or more IP addresses, of one or more devices associated with a payer, included in a profile of the payer,
where the profile is identified based on the received monetary transaction information;
a third component to identify a first account associated with the payer and a second account associated with a payee, based on the received monetary transaction information;
a fourth component to determine whether sufficient funds exist in the identified first account, and at least one of whether the identified first account has been disabled, or whether a previous fraudulent activity of a user has been detected for the first account;
a fifth component to transfer funds between the first account and the second account, based on the amount information and the fourth component; and
a sixth component to notify a wireless device associated with the payer of the transfer of funds, the notification including an itemization of goods or services associated with the transfer.

26. The network device of claim 25, further comprising a profile determination device that determines the profile of the payer and a payee profile.

27. The network device of claim 26, where the profile of the payer comprises at least one of financial information, device information, security information, historical information, transaction information, or authorized recipient information.

28. The network device of claim 26, where the profile determination device determines the payee profile based on the information relating to the second account associated with the payee.

29. The network device of claim 25, further comprising a transaction database that records information about the transfer of the funds.

30. The network device of claim 25, where the device includes at least one of a household appliance, a television, a vending machine, a refrigerator, a washing machine, a heater, an air conditioner, or a refrigerator.

31. The network device of claim 25, where the monetary transaction information that comprises at least one of personal information about the payer including a name, an age, an address, a city, a state, a phone, a fax, an e-mail address, or a wireless phone number.

32. The network device of claim 25, further comprising a security device that at least one of monitors passwords, encrypts information, or monitors payer information.

33. The network device of claim 25, where the device identification information comprises one or more of a serial number, an electronic number identifier, or the IP address associated with the device.

* * * * *

UNITED STATES PATENT AND TRADEMARK OFFICE
CERTIFICATE OF CORRECTION

PATENT NO.        : 7,840,494 B2  
APPLICATION NO.   : 09/950025  
DATED             : November 23, 2010  
INVENTOR(S)       : Shawn Wiederin Page 1 of 1

It is certified that error appears in the above-identified patent and that said Letters Patent is hereby corrected as shown below:

In Claim 1, column 7, line 39, insert the word "USER" between the word "the" and ",".

should read - receive, from a wireless device associated with the user, a

Signed and Sealed this  
Eighth Day of November, 2011

David J. Kappos  
*Director of the United States Patent and Trademark Office*